Figure 1:
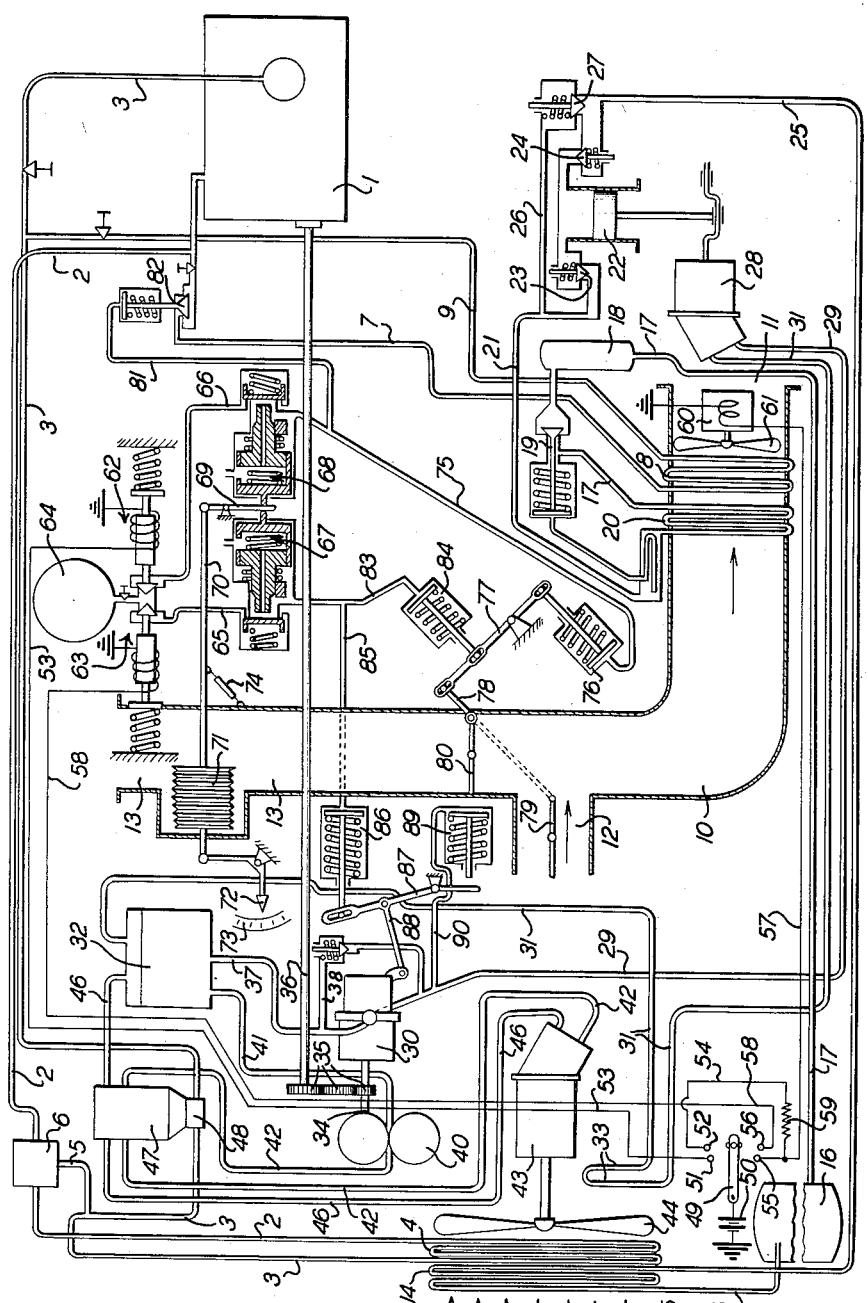

March 6, 1962 E. STUMP ET AL 3,024,006
AIR CONDITIONING INSTALLATIONS, ESPECIALLY FOR MOTOR VEHICLES
Filed Oct. 6, 1958 3 Sheets-Sheet 1

INVENTORS.
EUGEN STUMP
PAUL E. STRIFLER
BY Dicke and Craig
ATTORNEYS.

United States Patent Office 3,024,006
Patented Mar. 6, 1962

3,024,006
AIR CONDITIONING INSTALLATIONS, ESPECIALLY FOR MOTOR VEHICLES
Eugen Stump, Stuttgart-Untertürkheim, and Paul E. Strifler, Kornwestheim Kreis Ludwigsburg, Germany, assignors to Daimler-Benz Aktiengesellschaft, Stuttgart-Untertürkheim, Germany
Filed Oct. 6, 1958, Ser. No. 765,442
21 Claims. (Cl. 257—277)

The present invention relates to the control arrangement of an air-conditioning installation for motor vehicles, especially for buses, which consists essentially of a cooling installation provided with a compressor and of a warm-water heating installation operatively connected with the cooling circulatory system of the driving engine, and in which fresh air and possibly also re-circulated air is supplied into the vehicle interior space by means of a blower or fan.

The present invention has as its object to provide at relatively low cost and with relatively small expenditures a control system for such types of air-conditioning installations in such a manner that the energy consumption of each of the individual aggregates of the air-conditioning installation is not greater at any time than is necessary for purposes of achieving a certain temperature of the air within the vehicle interior space.

Accordingly, the present invention essentially consists of an arrangement in which the output or quantity of fluid medium supplied by an adjustable oil pump driven either from the vehicle driving engine or possibly from an auxiliary motor which supplies oil under pressure to an oil motor for purposes of driving the compressor of the cooling system is controlled in dependence on the temperature in the vehicle interior space, and in which simultaneously therewith, the absorption of the quantity of heat to be taken off or absorbed in the condenser of the cooling system is matched or adapted to the control of the compressor drive in that the condenser of the cooling system is connected in the system ahead of the cooler for the cooling circulatory system of the driving engine, the cooling blower of which is driven by a second oil pump itself driven either by the driving engine of the vehicle or by an auxiliary motor and by an oil motor whereby the quantity of fluid medium supplied by the second oil pump, i.e., the output thereof is controlled in dependence on the temperature of the cooling water returning from the cooler to the driving engine.

According to a further feature of the present invention, the output of or the quantity of fluid medium supplied by the adjustable oil pump serving for purposes of driving the oil motor for the compressor may be controlled with the aid of a pressure medium over a shifting valve and a control valve by means of an adjusting or displacing piston. Furthermore, one regulating piston each for controlling the fresh air quantity to be admitted or introduced into the vehicle interior space may be actuated by the control valve controlling the output of or quantity of fluid medium supplied by the oil pump driving the oil motor for the compressor and from a control valve serving for purposes of controlling a regulating valve arranged in the cooling circulatory system of the driving engine, respectively. Advantageously, the control of the control valves and of the adjusting and regulating pistons may take place by means of compressed air which, in most larger vehicles, as also especially in buses, is produced and used, for example, to actuate the servo-brake system.

The control of the control valves may advantageously take place by means of a thermostat adapted to be adjusted by the temperature prevailing in the re-circulating air channel or duct or in the vehicle interior space which thermostat may selectively be adjusted to a predetermined setting for purposes of maintaining a predetermined temperature within the vehicle interior space. Appropriately, the quantity of fresh air and re-circulated air to be introduced or admitted into the vehicle interior space may be adjusted simultaneously in such a manner that over the largest part of the adjusting range of the air-conditioning installation, limited by the maximum load or output of the drive, for example, from −10° C. up to +30° C., at least approximately the full amount of fresh air is used for purposes of heating or cooling the vehicle interior space in order to maintain, establish or produce a predetermined desired temperature of, for example, 24° C., and that re-circulated air from the vehicle interior space is used for purposes of maintaining or establishing this predetermined temperature only after exceeding or passing beyond this largest adjusting range, if the output of the installation no longer suffices for maintaining the preselected, desired, pre-set temperature.

According to still another feature of the present invention, the shifting valves for regulating the heating and cooling systems may be electrically controlled by means of a selectively actuatable control member which may be switched, at will, from heating to cooling. However, according to the present invention, a single shifting valve for regulating the heating and cooling systems may be controlled either electrically or with compressed air with the turning-on or engagement of the air-conditioning installation and either the cooling system or the warm water heating system may be rendered operatively or turned on by means of compressed air in dependence on the temperature within the vehicle interior space.

The present invention is further concerned with an installation for carrying out in practice the various control functions and includes, for purposes of controlling the fresh air inlet and the re-circulated air inlet, an arrangement of control valves operatively connected with each other by means of a connecting rod whereby a lever operatively connected with or secured to the connecting rod is in turn operatively connected with regulating or adjusting pistons which in turn are operatively connected with the control valve for the cooling system and with the control valve for the heating system. A centrifugal governor or speed regulating device limiting the rotational speed in any suitable manner may be provided for the compressor of the cooling installation which centrifugal governor acts on the adjusting member of the adjustable oil pump serving for the drive of the compressor.

Accordingly, it is an object of the present invention to provide an air-conditioning installation for motor vehicles which has a relatively simple control system and which minimizes the amount of energy consumed by the air-conditioning installation and its control system over a wide adjusting range thereof.

Another object of the present invention resides in the provision of a control system for an air-conditioning installation provided with a cooling and heating system, especially for motor vehicles, in which the amount of energy required by the systems is limited to the actual requirement necessary for maintaining the temperature within the vehicle interior space at a predetermined pre-set temperature.

Still another object of the present invention is the provision of a heating and cooling system for an air-conditioning installation of a motor vehicle in which oil under pressure and compressed air are used for purposes of driving and/or controlling the systems.

Figure 2:
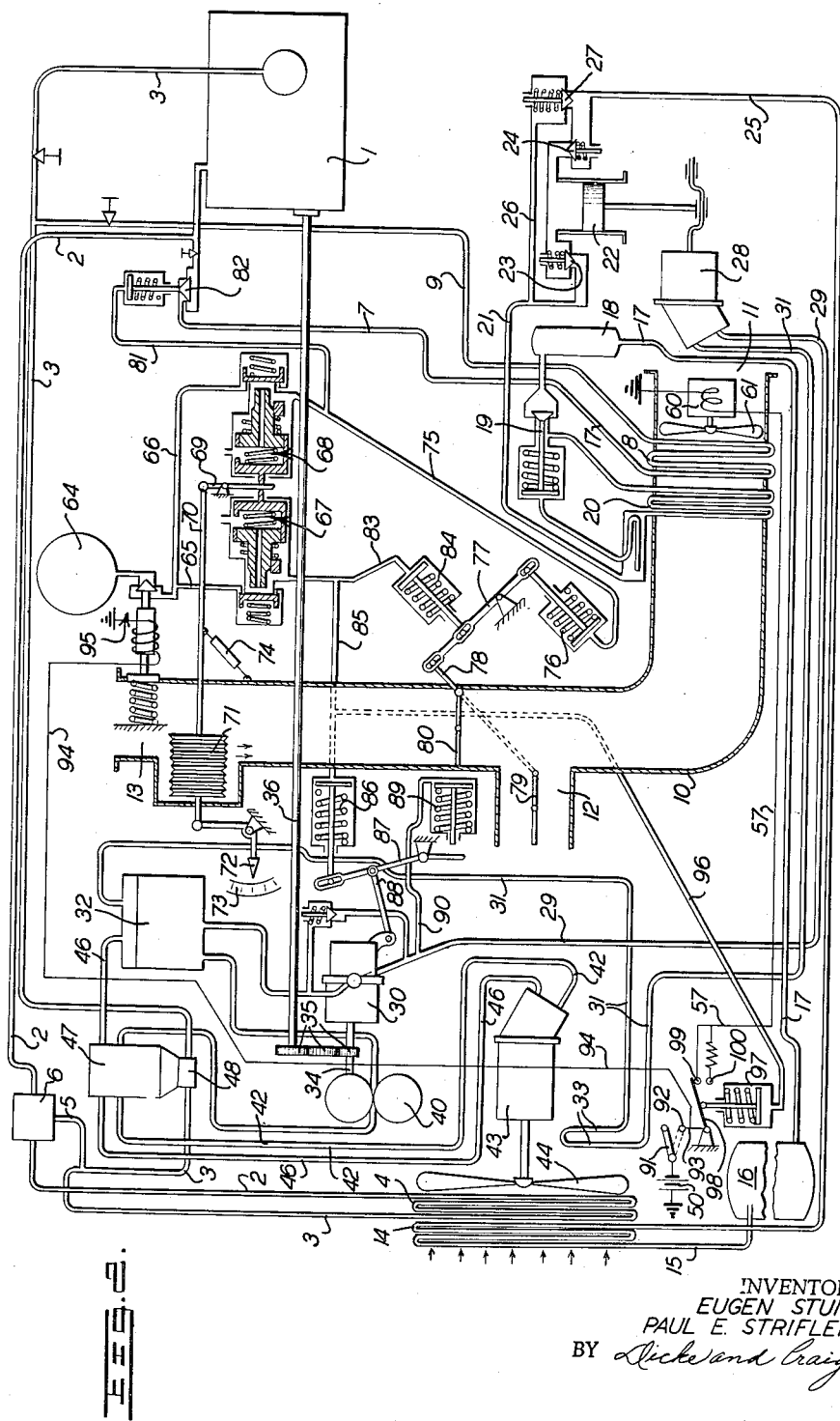
Figure 3:
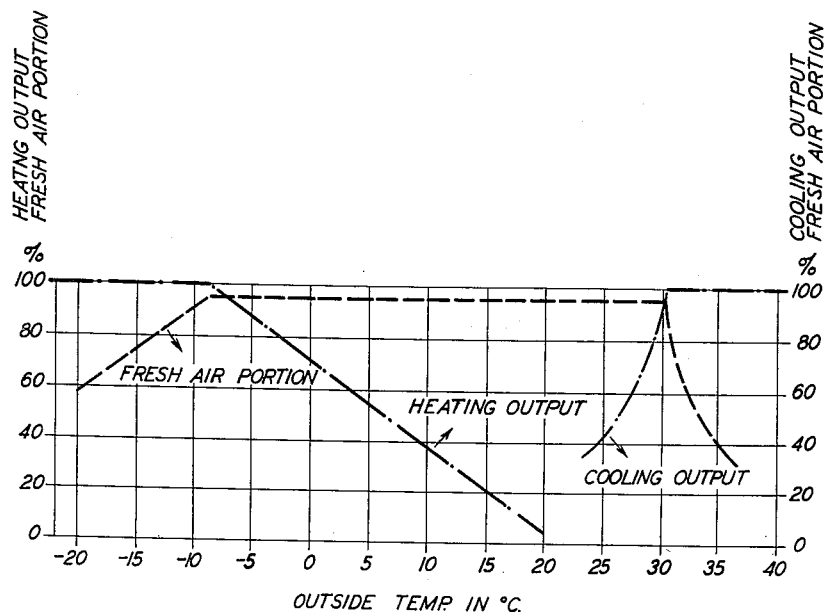

These and other objects, features and advantages of the present invention will become more obvious from the following description when taken in connection with the accompanying drawing, which shows, for purposes of illustration only, two embodiments in accordance with the present invention, and wherein:

FIGURE 1 is a schematic control diagram of an air-conditioning installation in accordance with the present invention in which a switch is used to selectively engage either the heating or cooling system thereof, FIGURE 2 is a schematic control diagram of a modified embodiment of an air-conditioning installation for motor vehicles, essentially similar to FIGURE 1, in which, however, only the air-conditioning installation as such is adapted to be turned on or off and in which either the heating or cooling system thereof is automatically rendered operative, and FIGURE 3 is a control diagram of the air-conditioning installation according to FIGURES 1 and 2 in which the percentage proportions of fresh air during heating and cooling operation as well as the outputs of the heating and cooling systems are plotted against the atmospheric outside temperature.

Referring now to the drawing, wherein like reference numerals are used throughout the various views to designate like parts, and more particularly to FIGURE 1, reference numeral 1 designates therein the water-cooled driving engine for the air-conditioning installation which simultaneously constitutes the driving engine for the motor vehicle itself. The cooling water jacket (not shown) of the driving engine 1 is operatively connected, on the one hand, over line 2 and over line 3 with the cooler or radiator 4, whereby a short-circuiting line 5 provided with a thermostat 6 interconnected in line 2 is operatively connected between lines 2 and 3. A line 7 branches off from line 2 which line 7 leads to the heater 8. A further line 9 operatively connects the heater 8 with the line 3. The heater 8 is arranged within an air duct or channel 10, the opening 11 of which leads into the vehicle interior space, and through the opening 12 of which fresh air may enter the air duct, whereas re-circulated air from the vehicle interior space may enter into the air duct 10 through opening 13 thereof.

The condenser 14 of the cooling system is arranged ahead of the cooler or radiator 4 for the water cooling system of the driving engine 1. A line 15 leads from the condenser 14 to the reservoir or tank 16 for the cooling medium. A line 17 branches off from the reservoir 16 into which a filter 18 and a safety valve 19 are inserted or interconnected and which leads to the evaporator 20. The evaporator 20 is disposed within the air duct 10 ahead of the heater 8. The line 21 leads from the evaporator 20 to the compressor 22 for the cooling medium schematically shown in the drawing which is provided with valves 23 and 24, whereas a further line 25 operatively connects the compressor 22 with the condenser 14. The short-circuiting line 26 provided with a safety valve 27 is interconnected between the lines 21 and 25 in bypassing relationship with respect to the compressor 22.

The drive for the compressor 22 takes place by means of the oil motor 28 to which oil under pressure is supplied through line 29 from the adjustable oil pump 30, and from which pressureless oil flows back through line 31 to the oil reservoir 32. The loop 33 of line 31 is thereby arranged behind the cooler 4 in such a manner as to be affected by the cooling air flow produced by the blower 14. The oil pump 30 is driven by means of shaft 34 over gears 35 and shaft 36 from the driving engine 1. The suction line 37 between the oil reservoir or tank 32 and the oil pump 30 is connected with pressure line 29 by means of a short-circuiting line 38 in which an excess pressure or safety valve 39, for example, of the check-valve type is arranged.

A second oil pump 40, for example, a gear pump, is driven from shaft 34 which pump 40 draws in oil from the oil reservoir 32 through suction line 41 and supplies over pressure line 42 the oil motor 43 with a fluid medium under pressure, such as oil under pressure, for purposes of driving the blower 44 by means of motor 43. The blower 44 is arranged between the cooler or radiator 4 and the loop 33 of line 31 and supplies fresh air through the condenser 14 and the cooler 4 in the direction of arrow 45. Pressureless oil reaches or returns to the oil reservoir 32 from oil motor 43 through line 46. A regulating valve 47 of any suitable conventional construction is inserted in lines 42 and 46 which either connects or separates the pressure line 42 of oil pump 40 with return line 46 leading back to the oil reservoir 32 in dependence on a thermostat 48 arranged in line 3 carrying the cooling water for the driving engine 1.

For purposes of controlling or engaging the air-conditioning installation, a switch 49 is provided which is electrically connected with one terminal of a voltage supply 50, the other terminal of which is grounded as is conventional. From the position indicated in FIGURE 1, the switch 49 may be switched either into one position for heating in which it bridges the contacts 51 and 52 of the lines or circuits 53 and 54, or into a position for cooling in which it bridges the contacts 55 and 56 of lines or circuits 57 and 58. The line 54, in which a series-resistance 59 is connected, is electrically connected with line 57 which leads from terminal 55 to an electric motor 60 for driving the blower 61 in the air duct 10 disposed to the rear of or behind the evaporator 20 and the heater 8. The line 53 leads from terminal 51 to an electromagnetic shifting valve 62 for the heating system, whereas the line 58 leads from terminal 56 to an electromagnetic shifting valve 63 for the cooling system.

Both electromagnetic shifting valves 62 and 63 control the flow of pressurized air from the compressed air reservoir or tank 64 into the lines or conduits 65 and 66 which lead to the control valve 67 for the cooling system and to the control valve 68 for the heating system. The actuation of the control valves 67 and 68 takes place by means of lever 69, which is operatively connected with the connecting rod 70. The rod 70 is displaced in the longitudinal direction thereof by a thermostat 71 which responds to the temperature of the air in the re-circulating air channel or in the vehicle interior space and which is arranged in the aperture 13 for the supply of re-circulating air to the air duct 10. The predetermined setting of the thermostat 71 may be influenced or adjusted by means of the indicator lever 72 which is operatively connected with thermostat 71 and by reference to an appropriate scale 73 suitably arranged within the operating range of indicator arm 72. A damping arrangement 74 of any suitable construction, for example, of hydraulic dash-pot construction damps the movements of the rod 70 and therewith of thermostat 71.

The supply of compressed air for the line 75 from tank 64 over line 66 and leading to the adjusting piston 76 is controlled by the control valve 68 for the heating system which piston 76 is operatively connected with one end of a scale-beamlike lever 77. The other end of the lever 77 is operatively connected with the rod 78 which controls the closure valve 79 for the admission of fresh air through aperture 12 into the air duct 10 and the closure valve 80 for the supply of re-circulated air through the aperture 13 into the air duct 10. The branch line 81 branching-off from line 75 controls the water regulating valve 82 disposed in the line 7 leading to the heater 8.

The control valve 67 for the cooling system controls the passage of compressed air from tank 64 over line 65 through the line 83 to the adjusting piston 84 which is operatively connected with the scale-beamlike lever 77 intermediate the pivotal point thereof and the pivotal connection of rod 78 for actuating the closure valves 79 and 80. The adjusting pistons 76 and 84 act in opposite directions on lever 77. From the foregoing it will be seen that the temperature responsive device 71 is connected by progressively adjustable actuating means such as the control valve 67 and 68 progressively regulating the fluid pressure in lines 75, 81, 83 and 85 to not only progressively control the adjustment of the closure valves 79 and 80 but also to progressively control the heating or cooling effects available at the heater 8 or the evaporator 20, respectively. During a cooling operation a rise in temperature of the thermally responsive device 71 beyond a predetermined value will progressively reduce the supply of fresh air and increase the supply of recirculated air past the evaporator 20, whereas, during a heating operation, a decrease in the temperature of the device 71 beyond a predetermined value results in a similar reduction in the supply of fresh air and increase in the supply of recirculated air past the heater 8.

The line 85 branches off from line 83 for purposes of adjusting or actuating by means of compressed air the adjusting piston 86 which adjusts over lever 87 and rod 88 the output or quantity of oil supplied by the oil pump 30. The adjusting piston 89 acts on the opposite end of lever 87 which piston 89 is supplied with oil under pressure over a branch line 90 branching off from line 29.

An additional thermostat may be appropriately arranged behind the blower 61 in the air duct 10 since at this place the temperature of the air supplied to the vehicle interior can be readily sensed, and the control movements of such additional thermostat may then be superimposed on those of the thermostat 71 so that no sudden and large temperature jumps take place in connection with the air to be supplied to the interior space of the vehicle.

*Operation*

The operation of the air-conditioning installation of FIGURE 1 of the present invention is as follows:

In order to heat the vehicle interior space, the switch 49 is moved from the neutral central position thereof in contact with the terminals or contacts 51 and 52. As a result of thus switching contact 49, the blower 61 disposed in air duct 10 behind the heater 8 is turned on or placed into operation over lines 54 and 57 and electric motor 60, on the one hand, however, with the blower 61 rotating at a reduced rotational speed as a result of the series-resistance 59 effective in line 54, while, on the other, the shifting valve 62 for the heating system is energized over electric line 53 so that compressed air from the compressed air reservoir 64 flows into the line 66. Depending on the displacement or movement of the thermostat 71 and therewith of connecting rod 70, compressed air will flow over the control valve 68 for the heating system into the line 75 and also into the line 81. The water regulating valve 82 in line 7 is thereby so controlled by the compressed air in line 81 that the heated cooling water coming from driving engine 1 is able to flow into the heater 8 where a heat exchange takes place with the air supplied by blower 61.

As may be seen more clearly from FIGURE 3, which is a diagram showing the heating output and cooling output, as well as fresh air portion in percentage against the outside temperature, for a predetermined driving condition and condition of the air assumed as an illustrative example only, with an outside temperature of between −10° C. to +30° C. and with an inside temperature to be regulated or adjusted to about +24°, the fresh air portion amounts to about 100% without considering any leakages through the closure valves and the slight airflow necessary for actuating the thermostat arranged in a recirculating air channel, etc. It follows therefrom that with an outside temperature of −10° C., the closure valve 79 (FIGURE 1) for the fresh air is opened and the closure valve 80 for the recirculated air is closed or remains closed. Only with an increasing lowering of the outside air temperature below −10° C., the fresh-air portion is gradually decreased by closure of the closure valve 79 and the recirculated air portion is increased by opening of the closure valve 80 or at that point is only gradually subjected to an adjusting control so as to be able to maintain, with the given limit of the heating output the desired temperature of 24° C. within the interior of the vehicle. The control of this operation takes place in dependence on the thermostat 71 by means of compressed air flowing through line 75 to the adjusting piston 76 against the spring pressure of the spring arranged about the adjusting piston 84.

Since the oil pump 40 is continuously driven by the driving engine 1 over shaft 36, gears 35 and shaft 34, this oil pump 40 continuously supplies oil to the line 42 which, with a relatively low temperature of the cooling water flowing back in line 3 to the driving engine from cooler 4, is operatively connected with the line 46 leading to the oil reservoir 32 by means of thermostat 48 and control valve 47. The blower 44 is not driven at first so that sufficient warm cooling water from the driving engine 1 is available for the heater 8. The thermostat 48 responds only with an increased heating or warming up of the cooling water flowing back through line 3. As soon as the thermostat 48 is rendered operative by the warmed-up water in line 3, control valve 47 closes the connecting path from line 42 to line 46, and thereby opens up both lines in their respective normal directions. As a result thereof, pressure oil reaches over line 42 the oil motor 43 which in turn now drives the blower 44.

In order to cool the interior space of the vehicle, the switch 49 is pivoted to come into contact with contact members 55 and 56. As a result thereof, initially the electric motor 60 and therewith blower 61 which is arranged in the air duct 10 to the rear of the evaporator 20 and/or to the rear of the heater 8 are turned on or energized over line or circuit 57, and more particularly with a relatively higher rotational speed than during heating since the resistance 59 is no longer operatively connected in series with the circuit 57. The shifting valve 63 for the cooling system is also engaged or energized over line 58 so that compressed air from the compressed air reservoir 64 may reach the control valve 67 for the cooling system over line or conduit 65. The control valve 67 is controlled in a similar manner as the control valve 68 for the heating system by means of thermostat 71 over the connecting rod 70 and lever 69 in dependence on the temperature of the air in the vehicle interior space in such a manner that the adjusting pistons 86, the lever 87 and the linkage 88 and therewith the output or quantity of oil supplied by oil pump 30 is influenced by the compressed air flowing through the lines 83 and 85. The higher the temperature within the vehicle interior space sensed by thermostat 71, the larger will be the output or quantity of oil supplied by pump 30. The oil motor 28 and therewith the compressor 22 are driven by the supply pump 30 over lines 29 and 31, whereby the compressor 22 forces the cooling medium present in the line system 25, 15, 17 and 21 between the evaporator 20 in air duct 10 and the condenser 14 disposed in front of the cooler 4 into a circulatory system.

Compressed air also reaches over line 83 the adjusting piston 84 for purposes of adjusting the closure valves 79 and 80, whereby these valves 79 and 80, as already described in connection with the heating system, are controlled according to FIGURE 3 in such a manner that under the assumed driving condition and condition of the air up to a predetermined outside temperature of +30° C., the closure valve 79 for the admission of fresh air is fully opened, whereas the closure valve 80 for the admission of re-circulated air is closed, and with higher outside temperatures the closure valve 79 is increasingly closed and the closure valve 80 increasingly opened.

Upon cooling of the air flowing through the evaporator 20 into the interior space, the relative humidity thereof increases. This undesirable side-effect of the cooling system may be lessened by a slight subsequent heating of the air in the heater 8 to the extent desired. For that purpose, a second water regulating valve may be arranged in the cooling water line 7 in parallel with the water regulating valve 82 of the heating system, the control piston of which is actuated by compressed air flowing through a branch line branching off from line 83. If the cooling system is turned on and the thermostat 71 actuates or acts on the compressed air line 83 through control valve 67, the second water regulating valve is also opened simultaneously with the compressor drive up to a predetermined flow cross section thereof. The heater 8 is thereby supplied with warm cooling water, and the cooled air flowing into the vehicle interior space is thereby slightly heated subsequently. The thermostat 71 regulates the adjustable pump 30 in such a manner that the desired temperature at thermostat 71 is again reestablished, though with a higher cooling output or with a lesser proportion of fresh-air participation than without humidity control.

The air-conditioning installation according to FIGURE 2 corresponds essentially in the details thereof and in the operation to that of FIGURE 1. Different in the embodiment of FIGURE 2, however, is the arrangement of the switch 91 operatively connected with the supply of electric power 50 which switch 91 may be pivoted from the indicated neutral position shown in full line in the drawing toward and into contact with the contact member or terminal 92, as shown in dashed lines in the drawing, whereby the electromagnetic shifting valve 95 for both the heating and the cooling systems is energized over line or circuit 93 and the line 94. The two compressed-air lines 65 and 66 branch off from the shifting valve 95, which lead, on the one hand, to the control valve 67 for the cooling system and, on the other, to the control valve 68 for the heating system. The passage of compressed air through the one or other control valve 67 or 68 is controlled by means of thermostat 71 over control or connecting rod 70 and lever 69.

The compressed air line 96 branches off from the compressed air line 85, which line 96 extends to the adjusting piston 97. The adjusting piston 97 in turn actuates the switch 98 which is operatively connected with the electric line 93 and which switch 98 is in contact with the terminal or contact member 99, when sufficient compressed air is present in lines 83 and 85 and therewith in line 96, i.e., when the air-conditioning system is automatically adjusted to cooling, and thereby enables the supply of electric current over line 57 to electric motor 60 disposed in air duct 10 for purposes of actuation of the blower 61.

If no compressed air is present in line 96, i.e., during heating, then the switch 98 is operatively connected with contact or terminal 100 so that in that case the electric motor 60 and therewith blower 61 are energized or set into operation through electric circuit 57 including this time the series resistance 59 so that the rotational speed thereof is smaller.

In the embodiment of FIGURE 2, an additional second water regulating valve may also be arranged again in line 7 in parallel with the water regulating valve 82, as described hereinabove in connection with FIGURE 1, for purposes of humidity control of the cooled air.

While we have shown and described two embodiments in accordance with the present invention, it is understood that the same is not limited thereto but is susceptible of many changes and modifications within the scope and spirit of the present invention, and we therefore do not wish to be limited to the particular embodiments illustrated herein but intend to cover all such modifications and changes as encompassed by the appended claims.

We claim:

1. An air-conditioning installation for air-conditioning the interior space of motor vehicles, especially of buses, having a driving engine provided with an engine-cooling circulatory system, comprising a vehicle cooling system including a compressor, a warm-water heating system including a heater, a radiator and first blower means, said warm-water heating system being operatively connected with said engine-cooling circulatory system, duct means with second blower means and regulating valve means for selectively supplying fresh air and recirculated air to said interior space of the vehicle, said heater being located to heat air circulated through said duct means, first adjustable drive means for driving said compressor, first thermostatic means responsive to the temperature within said vehicle interior space for adjustably regulating said first adjustable drive means, a condenser operatively connected with said compressor and disposed adjacent said radiator, said vehicle cooling system including evaporator means operatively connected with the condenser and the compressor for cooling air circulated through said duct means, second drive means for said first blower means, second thermostatic means responsive to the temperature of the cooling fluid in said engine-cooling circulatory system for adjustably controlling said second drive means, pressure-medium means for actuating said vehicle heating and cooling systems including line means having control valve means therein for selectively controlling the flow of said pressure medium, connecting means operatively connecting said first thermostatic means with said control valve means for selectively controlling the latter in response to the temperature within said vehicle interior space, and adjusting piston means in communication with said line means and operatively connected with said regulating valve means for selectively controlling the latter by the pressure medium in said line means as controlled by said control valve means to thereby selectively adjust the relative amounts of fresh air and recirculated air supplied to the vehicle interior space through said duct means.

2. An air-conditioning installation according to claim 1, wherein the pressure-medium of said pressure-medium means is compressed air.

3. An air-conditioning installation according to claim 1, wherein said warm water heating system includes further valve means for controlling the flow of cooling fluid from said engine-circulatory cooling system to said heater, and actuating means operatively connected with said line means for controlling said further valve means by the pressure medium as controlled by said control valve means.

4. An air-conditioning installation according to claim 3, wherein said further valve means is responsive to and operative by a lower pressure of said pressure medium than said adjusting piston means.

5. An air-conditioning installation according to claim 4, wherein one of said adjusting piston means adjustably controls said first drive means, and wherein the adjusting piston means controlling said regulating valve means is responsive to a higher pressure of said pressure medium than said one adjusting piston means.

6. An air-conditioning installation according to claim 1, wherein said drive means include adjustable oil pump means, oil motor means, and means connecting said oil pump means with said oil motor means.

7. An air-conditioning installation for air-conditioning the interior space of motor vehicles, especially of buses, having a driving engine provided with an engine-cooling circulatory system, comprising a vehicle cooling system including a compressor; a warm-water heating system including a heater, a radiator, and first blower means disposed adjacent said radiator, said warm-water heating system being operatively connected with said engine-cooling circulatory system; duct means including said heater, second blower means, a fresh-air inlet, a recirculated air inlet, and regulating valve means in said fresh-air inlet and in said recirculated air inlet for selectively supplying fresh air and recirculated air to said interior space of the vehicle; first drive means for driving said compressor, first thermostatic means responsive to the temperature within said vehicle interior space for adjustably regulating said first adjustable drive means, a condenser operatively connected with said compressor and disposed adjacent said radiator, said vehicle cooling system including evaporator means operatively connected with the condenser and the compressor for cooling air circulated through said duct means, second drive means for said first blower means, second thermostatic means responsive to the temperature of the cooling fluid in said engine-cooling circulatory system for adjustably controlling said second drive means; pressure medium means for actuating said vehicle heating and cooling systems including a source of actuating pressure medium, shifting valve means for selectively rendering operative said heating system and said cooling system, control valve means in said heating and cooling systems for selectively controlling the flow of said actuating pressure medium, line means connecting said source of actuating pressure medium through said shifting valve means with said control valve means, connecting means operatively connecting said first thermostatic means with said control valve means for selectively controlling the latter in response to the temperature within said vehicle interior space, and adjusting piston means operatively connected with said control valve means and with said regulating valve means for selectively controlling the latter by the pressure medium in said line means as controlled by said control valve means to thereby selectively adjust the relative amounts of fresh air and recirculated air supplied to the vehicle interior space through said duct means.

8. An air-conditioning installation for air-conditioning the interior space of motor vehicles, especially of buses, having a driving engine provided with an engine-cooling circulatory system, comprising a vehicle cooling system including a compressor; a warm-water heating system including a heater, a radiator, and first blower means disposed in front of said radiator, said warm-water heating system being operatively connected with said engine-cooling circulatory system; duct means including said heater, second blower means, a fresh-air inlet, a recirculated air inlet, and regulating valve means in each of said fresh-air and recirculated air inlets for selectively supplying fresh air and recirculated air to said interior space of the vehicle, first drive means for driving said compressor, first thermostatic means responsive to the temperature within said vehicle interior space for adjustably regulating said first adjustable drive means, a condenser operatively connected with said compressor and disposed in front of said radiator, said vehicle cooling system including evaporator means operatively connected with the condenser and the compressor for cooling air circulated through said duct means, second drive means for said first blower means, second thermostatic means responsive to the temperature of the cooling fluid in said engine-cooling circulatory system for adjustably controlling said second drive means, pressure medium means for actuating said vehicle heating and cooling systems including a source of actuating pressure-medium, shifting valve means for selectively rendering operative said heating system and said cooling system, control valve means in each of said heating and cooling systems for selectively controlling the flow of said actuating pressure medium, line means connecting said source of actuating pressure-medium through said shifting valve means with the input of a respective control valve means, connecting means operatively connecting said first thermostatic means with both of said control valve means for selectively controlling the latter in response to the temperature within said vehicle interior space, a plurality of adjusting piston means, further line means connecting the outputs of said two control valve means with respective adjusting piston means, at least one of said adjusting piston means each being connected by a respective one of said further line means to one of the outputs of said control valve means, and linkage means operatively connecting said adjusting piston means with said regulating valve means to selectively adjust the latter by the actuating pressure-medium in said further line means as controlled by respective control valve means to thereby selectively adjust the relative amounts of fresh air and recirculated air supplied to the vehicle interior space through said duct means by the selective adjustment of said regulating valve means.

9. An air-conditioning installation according to claim 8, wherein said engine-cooling circulatory system includes a further control valve operative to adjust the flow of cooling fluid in the line from said engine-cooling circulatory system to said heater, further adjusting piston means for controlling said further control valve, and branch line means branching off from the further line means of said heating system for controlling said further adjusting piston means by the actuating pressure-medium therein.

10. An air-conditioning installation according to claim 9 wherein said further adjusting piston means is responsive to a lower actuating pressure of said pressure medium than the adjusting piston means for said regulating valve means.

11. An air-conditioning installation according to claim 10, wherein both of the adjusting piston means for both of said regulating valve means are responsive to essentially the same actuating pressure of said pressure medium.

12. An air-conditioning installation according to claim 9, further comprising an additional control valve operatively connected in parallel to said further control valve in said line leading from said engine-cooling circulatory system to said heater, still further adjusting piston means for controlling said additional control valve, and another branch line means branching off from the further line means of said cooling system for controlling said still further adjusting piston means by the pressure medium therein.

13. An air-conditioning installation according to claim 8, further comprising additional adjusting piston means operatively connected with said first drive means for adjustably controlling said first drive means and branch line means branching off from one of said further line means and leading to said additional adjusting piston means, said additional adjusting piston means being responsive to a lower pressure of said actuating pressure medium than the one of said adjusting piston means for said regulating valve means which is connected to the same further line means.

14. An air-conditioning installation according to claim 13, wherein said last-mentioned further line means forms part of said cooling system.

15. An air-conditioning installation according to claim 8, further comprising link means for connecting both of said regulating valve means together for actuation thereof in unison and in mutually opposite directions, and a scale-beam-like lever operatively connected with said link means, the two adjusting piston means being each spring-loaded and acting on said scale-beam-like lever in such a manner that each adjusting piston means upon energization thereof by said pressure medium operates against the spring force of the other.

16. An air-conditioning installation according to claim 7, further comprising electrical means including switch means for selectively energizing said shifting valve means and said second blower means.

17. An air-conditioning installation according to claim 16, wherein two shifting valve means are provided independently actuatable by said electrical means.

18. An air-conditioning installation according to claim 16, wherein a single shifting valve means is provided, said electrical means including further switch means for selectively energizing the heating or cooling system, and means operative by the pressure medium in said cooling system for adjustably controlling said further switch means.

19. An air-conditioning installation according to claim 16, wherein said electrical means includes means for selectively adjusting the rotational speed of said second blower means.

20. An air conditioning installation for air conditioning the interior space of motor vehicles having a driving engine provided with an engine-cooling circulatory system, comprising a vehicle cooling system including a cooling device in heat transfer relationship with air circulated through said space, energizing means for operating said cooling system including means for progressively adjusting the degree of energization thereof to vary the cooling effect of said cooling device, a heater means for heating the air circulated through said space, said heater means being operatively connected to said engine cooling system and including progressively adjustable means for controlling the amount of heat available for heating said air at said heater means, duct means communicating with said space, said duct means being operatively associated with both said cooling device and said heater and including progressively adjustable air-flow-regulating valve means operatively connected to said duct means for selectively supplying fresh air and recirculated air past both said heater means and said cooling device to the interior space of the vehicle, and thermostatic means including a single temperature-responsive device responsive to the temperature within said vehicle interior space and actuating means operatively connected to said temperature responsive device for progressive adjustment thereby, said actuating means being operatively connected for progressively regulating the adjustment of each of said adjusting means for the cooling device, said heat controlling means and said air-flow-regulating valve means, means for adjusting said thermostatic means to select a predetermined temperature desired to be maintained in said interior space, said actuating means being operatively connected to adjust said heat controlling means to provide progressively increasing output of said heater means as the temperature outside the vehicle decreases during a heating operation of said installation, said actuating means being operatively connected to regulate the adjusting means for said cooling device to provide progressively increasing cooling effect of said cooling device as the outside temperature increases during a cooling operation of said installation, said actuating means being operatively connected to said air-flow-regulating valve means to progressively reduce the supply of fresh air and increase the supply of recirculated air through said duct means as the outside temperature, as reflected by said temperature-responsive device, both increases beyond a temperature above said selected temperature during a cooling operation of said installation and decreases beyond a temperature below said selected temperature during a heating operation of said installation.

21. An air conditioning installation for air conditioning the interior space of motor vehicles having a driving engine provided with an engine-cooling circulatory system, comprising a vehicle cooling system including a cooling device in heat transfer relationship with air circulated through said space, energizing means for operating said cooling system including means for progressively adjusting the degree of energization thereof to vary the cooling effect of said cooling device, a heater means for heating the air circulated through said space, said heater means being operatively connected to said engine cooling system and including progressively adjustable means for controlling the amount of heat available for heating said air at said heater means, duct means communicating with said space, said duct means being operatively associated with both said cooling device and said heater and including progressively adjustable airflow-regulating valve means operatively connected to said duct means for selectively supplying fresh air and recirculated air past both said heater means and said cooling device to the interior space of the vehicle, and thermostatic means including a single temperature-responsive device responsive to the temperature within said vehicle interior space and actuating means operatively connected to said temperature responsive device for progressive adjustment thereby, said actuating means being operatively connected for progressively regulating the adjustment of each of said adjusting means for the cooling device, said heat controlling means and said air-flow-regulating valve means, means for adjusting said thermostatic means to select a predetermined temperature desired to be maintained in said interior space, said air-flow-regulating valve means being connected to and adjustable by said temperature-responsive device via said actuating means to provide a high percentage of fresh air through said duct means over a range of temperature outside the vehicle, as reflected by the temperature of said temperature-responsive device, said actuating means being operatively connected to said air-flow-regulating valve means to progressively reduce the supply of fresh air and increase the supply of recirculated air through said duct means as the outside temperature both increases beyond a temperature above said selected temperature during a cooling operation of said installation and decreases beyond a temperature below said selected temperature during a heating operation of said installation, said actuating means being connected to adjust said heat controlling means to provide progressively increasing output of said heater means as the outside temperature decreases in said range below said selected predetermined temperature during heating operation of said installation, said actuating means being connected to regulate said adjusting means for said cooling device to progressively increase the cooling effect of said cooling device as the outside temperature increases in said range above said selected temperature during cooling operation of said installation.

References Cited in the file of this patent

UNITED STATES PATENTS

| | | |
|---|---|---|
| 2,069,418 | Otto | Feb. 2, 1937 |
| 2,177,596 | Haines | Oct. 24, 1939 |
| 2,212,503 | Nickell | Aug. 27, 1940 |
| 2,290,096 | Dale et al. | July 14, 1942 |
| 2,341,781 | Hornaday | Feb. 15, 1944 |